United States Patent
Abukawa

(10) Patent No.: US 6,851,245 B1
(45) Date of Patent: Feb. 8, 2005

(54) MORTAR-FILLED TYPE REINFORCING BAR JOINT

(75) Inventor: Masahiro Abukawa, Koshigaya (JP)

(73) Assignee: Splice Sleeve Japan, Ltd., Tokyo (JP)

( * ) Notice: Subject to any disclaimer, the term of this patent is extended or adjusted under 35 U.S.C. 154(b) by 0 days.

(21) Appl. No.: 10/030,461

(22) PCT Filed: Jun. 30, 2000

(86) PCT No.: PCT/JP00/04326

§ 371 (c)(1),
(2), (4) Date: Apr. 11, 2002

(87) PCT Pub. No.: WO01/04435

PCT Pub. Date: Jan. 18, 2001

(30) Foreign Application Priority Data

Jul. 9, 1999 (JP) ............................ 1999-195689

(51) Int. Cl.$^7$ ............................................. E04C 3/30
(52) U.S. Cl. ................ 52/726.1; 52/740.1; 52/711; 403/36.1; 403/362; 403/305
(58) Field of Search ............................. 52/726.1, 738.1, 52/740.1, 711; 403/361, 362, 314, 305, 265, 267, 268

(56) References Cited

U.S. PATENT DOCUMENTS 5,392,582 A 2/1995 Abukawa .................. 52/726.1

FOREIGN PATENT DOCUMENTS

| JP | 52-95215 | 7/1977 | |
| JP | 53-54105 | 12/1978 | ............. E04C/5/18 |
| JP | 56-12348 | 3/1981 | ............. E04C/5/18 |
| JP | 03262861 A | 11/1991 | ............. E04C/5/18 |
| JP | 4-34318 | 3/1992 | ............. E04C/5/18 |
| JP | 05098743 A | 4/1993 | ............. E04C/5/18 |
| JP | 1848027 | 9/1993 | ............. E04C/5/18 |
| JP | 09189097 A | 7/1997 | ............. E04C/5/16 |
| JP | 2711605 | 2/1998 | ............. E04C/5/18 |
| JP | 04293840 A | 10/2002 | ............. E04C/5/18 |

Primary Examiner—Carl D. Friedman
Assistant Examiner—Nahid Amiri
(74) Attorney, Agent, or Firm—L.C. Begin & Associates, PLLC

(57) ABSTRACT

A mortar grouting type joint for reinforcing bars is provided, which comprises a hollow cylindrical body having an opening cover (2) at an end, a bolt hole (8) on the side wall, and a supporting protrusion (5) on the inner peripheral wall, adapted to support reinforcing bars (12) with a bolt (13) and the supporting protrusion (5), wherein the supporting protrusion (5) consists of a pair of thin-walled members extending in parallel in the longitudinal direction of the hollow cylindrical body, and each thin-walled member has a ridge line (7) sloping toward the opening cover (2), with the portion of the thin-walled member supporting the reinforcing bar (12) inserted through the opening cover (2) constituting the apex, whereby the reinforcing bar to be inserted can be automatically guided to the position coaxial with the joint, said joint being suitable for performing connection of a number of sets of bare reinforcing bars such as connection of reinforcing bar structures.

19 Claims, 3 Drawing Sheets

MORTAR-FILLED TYPE REINFORCING BAR JOINT

TECHNICAL FIELD

The present invention relates to a mortar grouting type joint for reinforcing bars suitable for connection of reinforcing bars and, in particular, pre-assembled reinforcing bars and connection of horizontal reinforcing bars of precast reinforced concrete (hereinafter abbreviated as PC) members.

BACKGROUND ART

A mortar grouting type joint for reinforcing bars consists of a hollow cylindrical body. Reinforcing bars are inserted into it through the openings at its both ends, and the cylindrical body is filled with mortar to thereby accomplish a butt type connection between a pair of reinforcing bars. This type of joint, which is disclosed in Japanese Patent No. 1848027, etc., is widely used in practice.

Conventionally, this joint has been used in vertical main reinforcing bar connection between PC members. That is, after placing a lower PC member from whose upper surface the upper end portions of main reinforcing bars protrude upwards, an upper PC member in whose lower end portion are embedded mortar grouting type joints for reinforcing bars with the lower end portions of main reinforcing bars inserted therein, is placed in such a manner that the above-described exposed reinforcing bars are accommodated in the embedded joints, and then the embedded joints are filled with mortar. This arrangement is advantageous in that the upper and lower PC members are connected to each other in a condition in which they are substantially in contact with each other, and that it is possible to connect a number of vertical reinforcing bars together simultaneously by a single process.

JP, A, 9-189097 discloses a mortar grouting type joint in which there is provided on the inner wall surface of a tubular sleeve a supporting protrusion perpendicularly to the central axis of: the sleeve and in which a reinforcing bar is pressed against the supporting protrusion by a bolt screwed in through a bolt hole provided in the portion of the inner wall surface of the tubular sleeve facing to this supporting protrusion, thereby securing the reinforcing bar in position.

Recently, large diameter reinforcing bars have come to be generally used for shorter term of works and labor saving. As a result, mortar grouting type joints for reinforcing bars as disclosed in Japanese Patent No. 1848027, etc. are often used for so-called bare connection of reinforcing bars and, in particular, the bare connection of pre-assembled reinforcing bar structures. This is due to the fact that, as the reinforcing bar diameter increases, the reinforcing bar connecting means conventionally used in this field (gas pressure welding, screw coupler system, etc.) deteriorate in reliability and lead to increased difficulty in operation, whereas the mortar grouting type joint for reinforcing bars involves no such problems even in the case of large diameter reinforcing bars.

In the case of the bare connection of pre-assembled reinforcing bar structures (which includes vertical connection and horizontal connection), there are a large number of pairs of reinforcing bars to be connected together. In the conventional connecting methods, the connection is impossible unless all of them are in a perfect coaxial relationship. Thus, after placing the reinforcing bar structure to be connected at a predetermined position with respect to the other reinforcing bar structure already installed, alignment has to be performed to effect coaxial adjustment for each of the large number of pairs of reinforcing bars, which involves a very difficult and time-consuming operation.

When effecting the connection by means of mortar grouting type joints, one end of each joint is attached to a reinforcing bar of the already installed reinforcing bar structure beforehand, and alignment is roughly performed between the reinforcing bars of the structure to be connected and those of the already installed structure. Then, the joints are pulled back to the side of the structure to be connected and the facing portions of the reinforcing bars of each pair are positioned at the center in the longitudinal direction (hereinafter simply referred to as the center) of the joint to thereby attain a substantially coaxial relationship. In this case, if a perfect coaxial relationship cannot be attained, connection is possible by filling the joints with mortar.

Thus, with the mortar grouting type joint, connection is possible even if the reinforcing bars are not in a perfect coaxial relationship, which means it is superior in operational efficiency.

This is due to the fact that there is a considerable margin between the inner diameter of the joint and the outer diameter of the reinforcing bars, and that deviation of the reinforcing bars can be offset to some degree by the joint. This margin has been very effective in the mode of use of the conventional mortar grouting type joint, which is embedded in precast concrete.

However, this disadvantageously involves an increase in the thickness of the joint. In the case of a joint for bare reinforcing bars, both the reinforcing bars and the joint are freely movable to some degree, so that this dimensional margin may be small, making it possible to reduce the size of the entire joint as compared with the conventional joints.

Further, the mortar with which the joint is filled takes a considerable amount of time before it cures. In the conventional method of using a mortar grouting type joint in which the joint is embedded in precast concrete, there is no need to secure the joint in position until the mortar cures, whereas, in the case of the connection of bare reinforcing bars, securing is necessary until the mortar cures.

Also, when the mortar grouting type joint for reinforcing bars having a supporting protrusion as disclosed in JP, A, 9-189097 is used for the connection of bare reinforcing bars, the following problem is involved: since the supporting protrusion is formed perpendicularly to the central axis of the sleeve, that is, formed along the inner periphery of the sleeve, the mortar flow along the sleeve central axis is hindered by the supporting protrusion when filling the sleeve with mortar, so that there is a large grouting resistance or space unfilled with mortar (void) is formed on the back side of the supporting protrusion, resulting in a deterioration in the reinforcing bar connecting performance of the joint.

DISCLOSURE OF THE INVENTION

In view of the above problems, it is an object of the present invention to provide a mortar grouting type joint for reinforcing bars which is particularly suitable for bare connection of reinforcing bar composites each consisting of a large number of reinforcing bars as in the case of pre-assembled reinforcing bar structures.

In accordance with the present invention, there is provided a mortar grouting type joint for reinforcing bars consisting of a hollow cylindrical body having an opening cover at an end, a bolt hole on the side wall, and a supporting protrusion on the inner peripheral wall, adapted to support reinforcing bars with a bolt and the supporting protrusion, wherein the supporting protrusion consists of a pair of thin-walled members extending in parallel in the longitudinal direction of the hollow cylindrical body, and wherein the thin-walled member each have a ridge line sloping toward the above-described opening cover, with the portion of the thin-walled member supporting the reinforcing bar inserted through the opening cover constituting the apex.

In the above joint, it is desirable for the hollow cylindrical body to have an opening cover at both ends thereof, with a supporting protrusion supporting each reinforcing bar inserted through each opening cover being provided on both sides. Further, it is desirable for each of the pair of thin-walled members constituting the supporting protrusion to have an angle ridge line sloping on both sides with the portion supporting the reinforcing bar constituting the apex. Further, the bolt hole is situated between the supporting protrusion and the opening cover, and also situated in the portion of the cylindrical body side wall facing to the supporting protrusion, which is preferable. Further, in the above-described joint, it is desirable that the distance between the reinforcing bar supporting portions of the pair of thin-walled members be smaller than the diameter of the reinforcing bar and that the distance between the reinforcing bar supporting portion and the cylindrical body central axis be substantially equal to the radius of the circular hole of the opening cover. Further, it is desirable that the bolt hole be provided in the vicinity of the point at which the straight line passing through the midpoint between the reinforcing bar supporting portions of the pair of thin-walled members and the central axis of the hollow cylindrical body intersects the inner wall of the hollow cylindrical body.

In the joint of the present invention, the line segment connecting the contact points of each of the pair of thin-walled members and the cylindrical body inner wall is arranged perpendicularly to the thin-walled members, the pair of thin-walled members extending parallel to each other. Further, in the joint of the present invention, the line segment connecting the contact points of the pair of thin-walled members and the cylindrical body inner wall may be arranged perpendicularly to the thin-walled members, the distance between the pair of thin-walled members increasing continuously from the reinforcing bar supporting portions toward the opening cover side of the hollow cylindrical body. Further, in the joint of the present invention, the angle made by the line segment connecting contact points of the pair of thin-walled members and the inner wall of the hollow cylindrical body and by the thin-walled members may constitute an acute angle, the pair of thin-walled members being parallel to each other. Further, in the joint of the present invention, the angle made by the line segment connecting the contact points of the pair of thin-walled members and the inner wall of the hollow cylindrical body and by the thin-walled members may constitute an acute angle, the distance between the pair of thin-walled members increasing continuously from the reinforcing bar supporting portions toward the both ends of the hollow cylindrical body.

In the joint of the present invention, it is desirable that the diameter of the circular hole of the opening cover be the same as the diameter of the reinforcing bar inserted into the joint, or that an appropriate clearance be provided between the circular hole of the opening cover and the reinforcing bar inserted into the joint. Further, in the joint of the present invention, a seal member mounting portion may be integrally attached to the outer side of the opening cover. Further, in the joint of the present invention, it is desirable that each of the facing surfaces of the pair of thin-walled members has a dip angle which facilitates the guiding of the reinforcing bar at the ridge line portion.

DESCRIPTION OF REFERENCE NUMERALS

Figure 1:
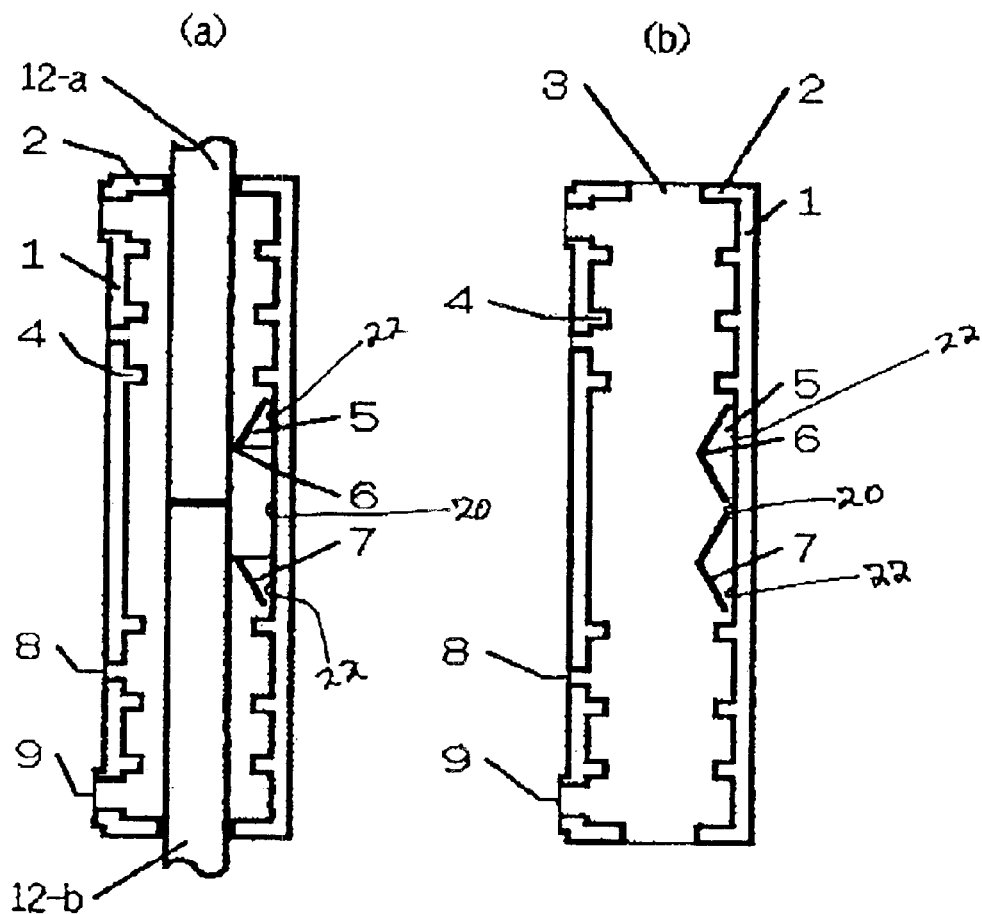
FIGS. 1(a) and 1(b) are longitudinal sectional views showing the mortar grouting type joint for reinforcing bars of the present invention, in which part (a) shows an example thereof and part (b) shows another example thereof.

1 . . . joint main body, 2 . . . opening cover, 3 . . . circular hole, 4 . . . annular protrusion, 5 . . . supporting protrusion, 6 . . . reinforcing bar supporting portion, 7 . . . ridge line, 8 . . . bolt hole, 9 . . . inlet or outlet, 10 . . . seal member mounting portion, 11 . . . screw, 12 . . . reinforcing bar, 13 . . . bolt, 14 . . . line segment connecting the contact points of the pair of thin-walled members and the inner wall of the hollow cylindrical body, 15 . . . surface having an inclination angle that facilitates the guiding of the reinforcing bar, 16 . . . midpoint between the reinforcing bar supporting portions of the pair of thin-walled members, 17 . . . central axis of the hollow cylindrical body, 18 . . . point at which the straight line passing through the midpoint 14 and the central axis 18 intersects the inner wall of the hollow cylindrical body.

EMBODIMENT FOR CARRYING OUT THE INVENTION

The mortar grouting type joint for reinforcing bars of the present invention (hereinafter referred to as the "joint") will be described with reference to the drawings. The joint 1 of the present invention consists of a hollow cylindrical body having an opening cover 2 at its end, a bolt hole 8 in its side wall, and supporting protrusions 5 on its inner wall surface. A reinforcing bar 12 inserted through a circular hole 3 provided in the opening cover 2 is supported by and secured to the joint by means of a bolt 13 threaded through the bolt hole 8, the supporting protrusions 5, and the edge of the circular hole 3 of the opening cover 2. In the joint of the present invention, the supporting protrusions 5 consist of a pair of thin-walled members extending in parallel in the longitudinal direction of the hollow cylindrical body. The portion of each thin-walled member supporting the reinforcing bar inserted through the opening cover 2 (reinforcing bar supporting portion) 6 constitutes the apex, the thin-walled member having a ridge line 7 sloping toward the opening cover 2 through which the reinforcing bar is inserted, and having contact points 22 with the cylindrical body. Note that the ridge line may be a straight line or an appropriately curved line concave or convex with respect to the wall surface of the hollow cylindrical body.

The reinforcing bar 12 inserted through the opening cover 2 is guided on the reinforcing guide surfaces 15 along the ridge lines 7 so as to be coaxial with the joint 1, enabling the reinforcing bar and the joint 1 to be easily arranged coaxially. Further, the supporting protrusion s 5 extend longitudinally in the hollow cylindrical member, so that, when grouting mortar, the supporting protrusion s 5 do not hinder the flow of mortar, and there is no fear that a void will be formed. The reinforcing bar arranged coaxially with the joint 1 is fixed to the joint 1 by the bolt 13. Since the reinforcing bar support portions 6 of the supporting protrusion s 5 serve as a support stand when the reinforcing bar is pressed by the bolt, it is possible to secure the reinforcing bar and the joint in position while maintaining them in the coaxial relationship.

Thus, as shown in FIG. 1, in the joint of the present invention, by providing the supporting protrusion s 5 for supporting the reinforcing bars 12a and 12b inserted through the opening covers 2 on the respective sides of the hollow cylindrical body, it is possible to easily arrange the two reinforcing bars respectively inserted through both ends of the hollow cylindrical body in a coaxial relationship and secure them in position. In this case, it is desirable for the supporting protrusion s 5 provided on either side of the hollow cylindrical body to be arranged at the corresponding positions in the periphery of the joint, i.e., installed such that the supporting protrusion s 5 are longitudinally aligned in the same straight line. When providing the supporting protrusion s 5 on either side of the hollow cylindrical body, there is no particular restriction regarding the longitudinal positions of the supporting protrusion s 5. Usually, the supporting protrusion s are provided in each of the half bodies obtained by dividing the hollow cylindrical body in two by a plane passing the midpoint of the central axis thereof and perpendicular to the central axis.

Note that, on the inner wall surface of the joint, a plurality of annular protrusions 4 are provided to a certain depth from the opening covers 2. These annular protrusions 4 serve to intensify the engagement between the cured mortar and the inner wall surface to thereby enhance the connection performance of the joint. In the joint of the present invention, the configuration and the installation positions of the annular protrusions are selected so as not to hinder the supporting of the reinforcing bar by the supporting protrusion s and the edge of the circular hole. It is desirable to provide no annular protrusions 4 in the region between the supporting protrusion s provided at different longitudinal positions of the hollow cylindrical body. Further, in the side wall of the joint, there are usually provided a inlet and a outlet 9 to be used when grouting or discharging mortar.

In the joint of the present invention, when, as shown in FIG. 1(b), the configuration of the ridge lines 7 of the thin-walled members constituting the supporting protrusion s 5a is an angle shape sloping on either side of the reinforcing bar supporting portion 6, the two reinforcing bars respectively inserted from the two ends of the joint can be arranged and secured in position in a coaxial relationship more easily as described below.

That is, when, in performing reinforcing bar connection, the joint is engaged with one reinforcing bar side (e.g., the reinforcing bar 12-a side (hereinafter referred to as side A), the reinforcing bar first comes into contact with the supporting protrusions 5 (arranged on side A of the joint) sloping toward the side A opening cover 2 through which the reinforcing bar is first inserted, and is automatically guided toward the reinforcing bar supporting portions 6 while sliding on the pair of thin-walled members constituting the supporting protrusions 5, until it is arranged coaxially with the joint on the supporting protrusion 5 side of the joint. As the engagement further progresses, the above-described reinforcing bar comes into contact with the ridge line portion sloping on the opening cover 2 side of the supporting protrusions s 5 installed on the other side (side B which is opposite to side A) of the joint, and is automatically guided toward the reinforcing bar supporting portions 6 while sliding on the pair of thin-walled members constituting the supporting protrusions s 5, until it is arranged coaxially with the joint also on side B of the joint. Next, when the joint is engaged with the other reinforcing bar (12-b) substantially aligned therewith, this reinforcing bar also becomes coaxial with the joint on both side A and side B thereof. The pairs of thin-walled members associated with the respective reinforcing bars 12-a and 12-b are separated by a substantially linear wall section 20. Next, the joint is pulled back by its half length toward the first reinforcing bar, and the contact position between the two reinforcing bars is mated with the longitudinal central portion of the joint. By this single reciprocal movement of the joint, the two reinforcing bars can easily attain a coaxial relationship. Thereafter, the bolt 13 is threaded in to fasten the reinforcing bar to the joint, whereby it is possible to prevent the coaxial relationship from being disturbed by the coaxial adjustment operation of other reinforcing bar pairs. This effect can be achieved by the fact that the thin-walled members constituting the supporting protrusions s have an angle shape ridge line sloping on both sides of the joint.

Figure 3:
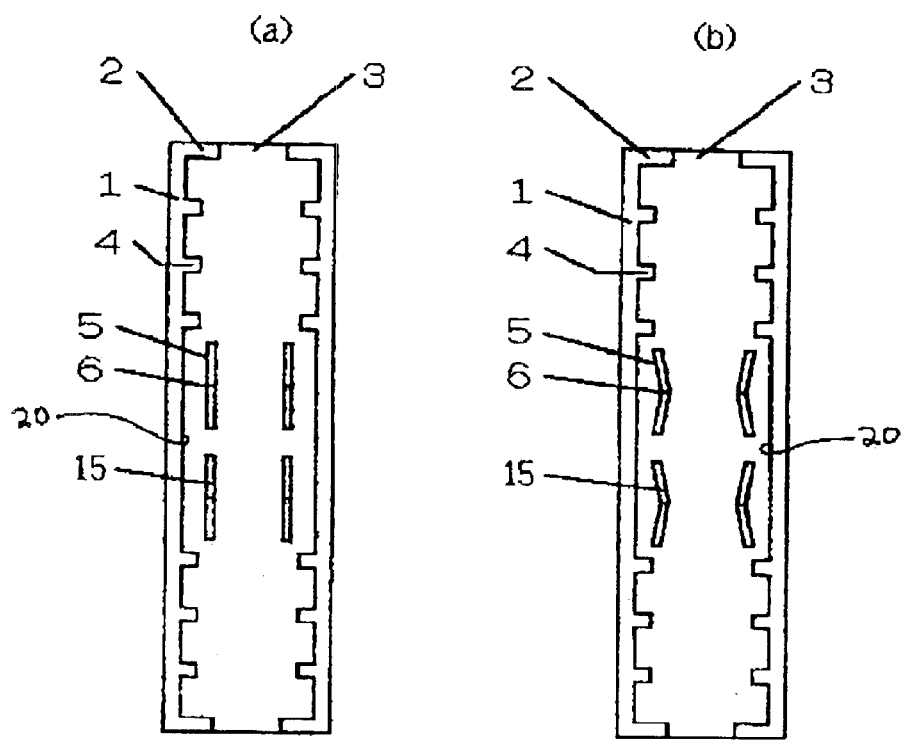
FIGS. 3(a) and 3(b) are longitudinal sectional views showing the way supporting protrusion s are arranged longitudinally with respect to a joint, in which part (a) shows an example thereof and part (b) shows another example thereof.

As shown in FIG. 3(a), in the joint of the present invention, the pair of thin-walled members 5 may extend parallel to each other, or the distance between the pair of thin-walled members 5 may continuously increase from the reinforcing bar supporting portion 6 toward the opening cover 2 side through which the reinforcing bar thereby supported is inserted. In addition, in the latter case, as shown in FIG. 3(b), the distance between the pair of thin-walled members 5 may continuously increase from the reinforcing bar supporting portion 6 toward the opening covers 2 at either end of the hollow cylindrical body. In either of the above-described cases, the thin-walled members 5 may, as shown in FIG. 4(a), be arranged perpendicularly to the line segment 14 connecting the contact points of the thin-walled members and the inner wall of the hollow cylindrical member, or, as shown in FIG. 4(b) they may make an acute angle with the above-described line segment 14.

By arranging the pair of thin-walled members 5 such that the distance between them continuously increases from the reinforcing bar supporting portion 6 toward the opening cover 2 at one or both ends of the hollow cylindrical member, it is possible to guide the reinforcing bar more smoothly toward the reinforcing bar supporting portion 6. Also, when the thin-walled members are arranged perpendicularly to the above-mentioned line segment 14, the releasing from the joint mold equipped with supporting protrusions is advantageously facilitated.

Figure 4:
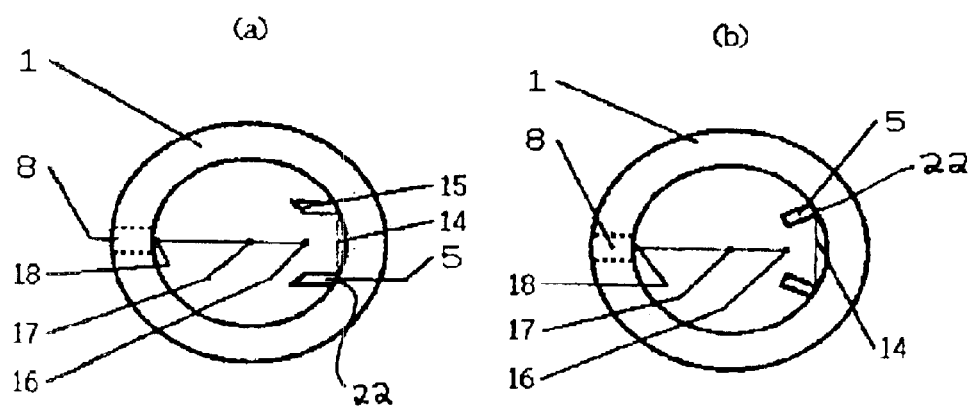
FIGS. 4(a) and 4(b) are schematic diagrams (cross-sectional views) showing the position of the bolt hole in the mortar grouting type joint for reinforcing bars of the present invention, in which part (a) shows an example thereof and part (b) shows another example thereof.
Figure 5:
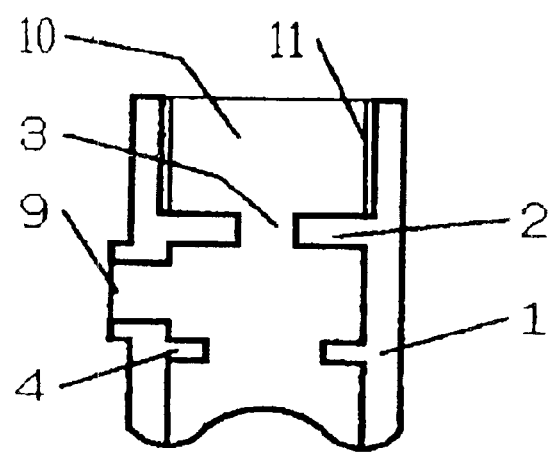
FIG. 5 is a longitudinal sectional partial view showing an example of a seal member mounting portion.

In the joint of the present invention, from the viewpoint of appropriately supporting the reinforcing bar by the supporting protrusion s, it is desirable that the distance between each of the reinforcing bar supporting portions 6 of the pair of thin-walled members constituting the supporting protrusions be set smaller than the diameter of the circular hole 3 of the opening cover 2, that is, the diameter of the reinforcing bar. Further, from the viewpoint of arranging and fixing the reinforcing bar and the joint coaxially, it is desirable that the distance from the reinforcing bar supporting portion 6 of each thin-walled member to the central axis of the hollow cylindrical body be substantially equal to the radius of the circular hole 3 of the opening cover 2, that is, the radius of the reinforcing bar. Further, to smoothen the guiding of the reinforcing bar by the supporting protrusions 5 and to strengthen the support of the reinforcing bar by the supporting protrusions 5, it is desirable that the opposing surfaces of the pair of thin-walled members be formed as surfaces 15 having an inclination angle facilitating the guiding of the reinforcing bar as shown in FIGS. 2, 4, etc.

Figure 2:
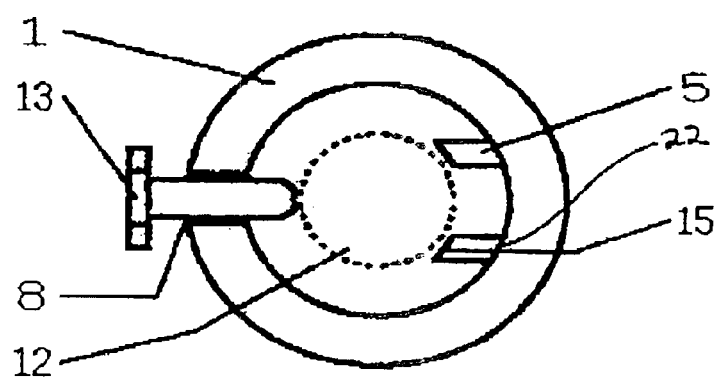
FIG. 2 is a cross-sectional view showing an example of the way a reinforcing bar is held by the mortar grouting type joint for reinforcing bars of the present invention.

In the present invention, from the viewpoint of fixing the reinforcing bar and the joint in a stable manner, it is desirable that the bolt hole 8 be provided at a position between the supporting protrusion s 5 and the opening cover 2 through which the reinforcing bar supported by the supporting protrusion s 5 is inserted and in the portion of the side wall of the hollow cylindrical body facing to the supporting protrusion s 5, as shown in FIGS. 1 and 2. Thus, of the two halves obtained by dividing the joint by a plane passing through the central axis of the hollow cylindrical body and parallel to the line segment 14 connecting the contact points of the pair of thin-walled member 5 and the inner wall of the hollow cylindrical body, one half has the supporting protrusion s 5, and the other half has the bolt hole B. More preferably, the bolt 8 is provided, as shown in FIG. 4, in the vicinity of a point 18 where the straight line passing through the midpoint 16 between the reinforcing bar supporting portions 6 of the pair of thin-walled members 5 and the central axis 17 of the hollow cylindrical body intersects the inner wall of the hollow cylindrical body.

From the viewpoint of fixing the reinforcing bar and the joint coaxially by supporting the reinforcing bar by the supporting protrusion s 5, the bolt, and the edge of the opening cover 2, it is desirable, in the joint of the present invention, that the diameter of the cylindrical hole 3 of the opening cover 2 be the same as the diameter of the reinforcing bar inserted into the joint. Taking the ease with which the reinforcing bar is inserted into the joint into consideration, it is possible to provide an appropriate clearance between the circular hole 3 of the opening cover 2 and the reinforcing bar inserted into the joint.

When grouting the joint with mortar, mortar will leak through the gap between the circular hole of the opening cover of the joint and the inserted reinforcing bar, so that it is necessary to seal the gap. FIG. 6 shows a joint equipped with a seal member mounting portion 10. The seal member mounting portion 10 consists of a cylindrical portion formed by extending the side wall of the joint main body 1 outside the opening cover 2 so as to be integral with the joint, the opening cover 2 constituting the bottom thereof. The seal member consists of a cylindrical member formed of rubber or the like and having at its center a reinforcing bar passing hole, a screw being provided on the side wall thereof. In the inner wall of the seal member mounting portion, there formed is a screw 11 adapted to be threadedly engaged with the above-mentioned screw, the seal member being attached to the joint through threaded engagement. While the seal member mounting portion is normally provided at both ends of the joint, it is possible to provide it only at one end in the case of vertical connection.

While for the sake of convenience the present invention has been described above as applied to the case in which reinforcing bar structures are connected, the mortar grouting type joint for reinforcing bars of the present invention can also be used for the connection of the horizontal main reinforcing bars of PC members. In this case, both of the main reinforcing bars to be connected stick out horizontally and are exposed, the joint being first engaged with one main reinforcing bar side, and then horizontal alignment of the other main reinforcing bar being effected. Thereafter, the same operation as described above is conducted.

INDUSTRIAL APPLICABILITY

When performing connection of a number of sets of bare reinforcing bars or when performing connection of the horizontal main reinforcing bars of the PC members, the mortar grouting type joint for reinforcing bars of the present invention provides the following advantages over the conventional mortar grouting type joint for reinforcing bars.

(1) The operation of adjusting the coaxial relationship of a number of pairs of reinforcing bars can be executed easily and quickly, thereby achieving a substantial improvement in terms of operational efficiency.

(2) The reinforcing bars can be secured in position easily and reliably until the mortar is grouted and the grouted mortar cures. Further, the resistance when grouting the joint with mortar is small, thereby achieving a reduction in operational time, simplification of operation, and a further improvement in operational efficiency.

(3) It is possible to make the difference in diameter between the circular hole of the opening cover and the reinforcing bar as small as possible, thereby making the diameter of the joint smaller and achieving an improvement in design fitness.

(4) Since it is possible to prevent void formation as a result of mortar grouting, there is no deterioration in the reinforcing bar connecting performance of the joint. Further, the reliability of the reinforcing bar connecting portion is improved, thereby achieving an improvement in the quality and safety of the reinforced concrete building.

What is claimed is:

1. A mortar grouting type joint for reinforcing bars, comprising:

a hollow cylindrical body defining a longitudinal central axis and having an opening cover (2) at first and second ends thereof, a bolt hole (8) on the side wall, and a first supporting protrusion (5) and a second supporting protrusion (5) at first and second respective axial positions on an inner peripheral wall, said supporting protrusions extending in a direction substantially parallel to said axis, each being adapted to support a reinforcing bar inserted through one of said opening covers, wherein the portion of the inner peripheral wall between the first and second supporting protrusions is substantially linear;

each supporting protrusion (5) consists of a pair of thin-walled members, wherein the contact points of each of said thin-walled members with said peripheral wall define substantially parallel lines; and said thin-walled members each have a ridge line (7) sloping relative to the peripheral inner wall, with the portion of each thin-walled member adapted for supporting the reinforcing bar (12) inserted through the opening cover (2) constituting the apex;

wherein said mortar grouting type joint defines an unobstructed space extending between the opening covers and aligned with said central axis, said space having a diameter at all points along a length of said joint that is equal to at least twice a distance between said central axis and apexes of said thin walled members.

2. A mortar grouting type joint for reinforcing bars according to claim 1, wherein each of the pair of thin-walled members constituting the first supporting protrusion (5) has a ridge line (7) sloping on both sides of the apexes of each of the thin walled members.

3. A mortar grouting type joint for reinforcing bars according to claim 1, wherein the bolt hole (8) is situated between the first supporting protrusion (5) and one of the opening covers (2).

4. A mortar grouting type joint for reinforcing bars according to claim 1, wherein the bolt hole (8) is situated in the portion of the cylindrical body side wall facing to the first supporting protrusion (5).

5. A mortar grouting type joint for reinforcing bars according to claim 1, wherein:
   the distance between the reinforcing bar supporting portions (6) of each pair of said thin-walled members is smaller than the diameter of a circular hole (3) in each opening cover; and
   the distance between the reinforcing bar supporting portion (6) and the cylindrical body central axis is substantially equal to the radius of the circular hole (3) of the opening cover (2) on the same side of the joint as the supporting protrusion.

6. A mortar grouting type joint for reinforcing bas according to claim 1, wherein the bolt hole (8) is proximate and substantially opposite the apexes of one of the pairs of the thin-walled members.

7. A mortar grouting type joint for reinforcing bars according to claim 1, wherein a line segment connecting the contact points of one of the pairs of thin-walled members and the cylindrical body inner wall is arranged perpendicularly to the thin-walled members, the pair of thin-walled members extending parallel to each other.

8. A mortar grouting type joint for reinforcing bars according to claim 1, wherein a line segment connecting the contact points of one of the pairs of said thin-willed members and the cylindrical body inner wall is arranged perpendicularly to the thin-walled members, the distance between the pair of thin-walled members increasing continuously from the reinforcing bar supporting portions (6) toward the opening cover (2) side of the hollow cylindrical body.

9. A mortar grouting type joint for reinforcing bars according to claim 1, wherein an angle made by a line segment connecting contact points of one of the pairs of said thin-walled members and the inner wall of the hollow cylindrical body and by the thin-walled members constitutes an acute angle.

10. A mortar grouting type joint for reinforcing bars according to claim 1, wherein an angle made by a line segment connecting the contact points of one of the pairs of said thin-walled members and the inner wall of the hollow cylindrical body and by the thin-walled members constitutes an acute angle, the distance between the pair of thin-walled members increasing continuously from the reinforcing bar supporting portions (6) toward an end of the hollow cylindrical body.

11. A mortar grouting type joint for reinforcing bars according to claim 1, wherein a first of the opening covers (2) comprises a circular hole adapted to receive a reinforcing bar (12) inserted into the joint.

12. A mortar grouting type joint for reinforcing bars according to claim 1, wherein a seal member mounting portion is integrally attached to the outer side of said opening cover (2).

13. A mortar grouting type joint for reinforcing bars according to claim 1, wherein facing surfaces of the pair of thin-walled member each have a dip angle which facilitates the guiding of the reinforcing bar (12).

14. A mortar grouting type joint for reinforcing bars comprising:
   a hollow cylindrical body having an opening cover (2) at an end, a bolt hole (8) on the sidewall, and a supporting protrusion (5) on the inner peripheral wall, adapted to support a reinforcing bar (12), wherein:
   the supporting protrusion (5) consists of a pair of thin-walled members extending longitudinally in the hollow cylindrical body; and
   said thin-walled member each have a ridge line (7) sloping toward the inner peripheral wall with a portion of each said thin-walled member adapted to support the reinforcing bar (12) inserted through the opening cover (2) constituting the apex; and
   wherein the bolt hole (8) is provided proximate a point on the sidewall that is substantially opposite a midpoint of a straight line connecting the apexes of said thin-walled members.

15. A mortar grouting type joint for reinforcing bars comprising:
   a hollow cylindrical body having an opening cover (2) at a bolt hole (8) on the sidewall, and a supporting protrusion (5) on the inner peripheral wall, adapted to support a reinforcing bar (12), wherein:
   the supporting protrusion (5) costs of a pair of thin-willed members extending longitudinally in the hollow cylindrical body; and
   said thin-walled member have a ridge line (7) sloping toward the inner peripheral wall, with a portion of the thin-walled members adapted to support the reinforcing bar (12) inserted through the opening cover (2) constituting the apex; and
   wherein a line segment connecting the contact points of each of the thin-walled members and the cylindrical body inner wall is oriented substantially perpendicular to the thin-walled members, the pair of said thin-walled members extending parallel to each other.

16. A mortar grouting type joint for reinforcing bars, comprising:
   a hollow cylindrical body defining a longitudinal central axis and having an opening cover (2) at an end, a bolt hole (8) on a sidewall, and a supporting protrusion (5) on an inner peripheral wall, said supporting protrusion adapted to support a reinforcing bar (12), wherein:
   the supporting protrusion (5) consists of a pair of thin-walled members extending in the longitudinal direction of the hollow cylindrical body; and
   said thin-walled members each have a ridge line (7) sloping toward the inner peripheral wall, with a portion of each thin-walled member adapted to support a reinforcing bar (12) inserted through the opening cover (2) constituting the apex; and
   wherein, the distance between the pair of said thin-walled members increases continuously from the apexes toward the opening cover (2).

17. A mortar grouting type joint for reinforcing bars, comprising:
   a hollow cylindrical body defining a longitudinal central axis having an opening cover (2) at an end, a bolt hole (8) on a sidewall, and a supporting protrusion (5) on an inner peripheral wall, the supporting protrusion being adapted to support reinforcing bars, wherein:
   the supporting protrusion (5) consists of a pair of thin-walled members extending in the longitudinal direction of the hollow cylindrical body; and
   said thin-walled members each decrease in height toward the opening cover (2), with a portion of each of the thin-walled members adapted to support the reinforcing bar (12) inserted through the opening cover (2) constituting the apex; and
   wherein contact points of the pair of said thin-walled members with the inner wall define first and second substantially parallel lines, and wherein a line segment connecting said first and second lines lies at an acute angle relative to the thin-walled members.

18. A mortar type joint for reinforcing bars, comprising:

a hollow cylindrical body having an opening cover (2) at an end, a bolt hole (8) on a sidewall, and a supporting protrusion (5) on an inner peripheral wall, adapted to support a reinforcing bar (12), wherein:

the supporting protrusion (5) consists of a pair of thin-walled members extending in a longitudinal direction of the hollow cylindrical body; and said thin-walled members each include an apex adapted to support a reinforcing bar inserted through the opening cover (2) and have a ridge line (7) sloping from the apex toward the inner peripheral wall; and wherein contact points of each of the pair of said thin-walled members and the inner peripheral wall define first and second lines separated by a distance that increases in a direction from the apexes toward the opening cover (2), and wherein a line segment connecting the first and second lines lies at an acute angle relative to the thin-walled portions.

19. A mortar grouting type joint for reinforcing bars, comprising:

a hollow cylindrical body defining a central axis and having an opening cover (2) at an end, a bolt hole (8) on a sidewall, and a supporting protrusion (5) on an inner peripheral wall, adapted to support a reinforcing bar (12), wherein:

the supporting protrusion (5) consists of a pair of thin-walled members extending in the hollow cylindrical body in a direction substantially parallel said central axis; and said thin-walled members each have a ridge line (7) sloping toward the inner peripheral, with a portion of the thin-walled members adapted to support the reinforcing bar (12) inserted through the opening cover (2) constituting the apex; and wherein a seal member mounting portion is integrally attached to the outer side of the opening cover (2).

* * * * *